US011232578B2

(12) United States Patent
Shamilov et al.

(10) Patent No.: US 11,232,578 B2
(45) Date of Patent: Jan. 25, 2022

(54) IMAGE PROCESSING SYSTEM FOR INSPECTING OBJECT DISTANCE AND DIMENSIONS USING A HAND-HELD CAMERA WITH A COLLIMATED LASER

(71) Applicant: Librestream Technologies Inc., Winnipeg (CA)

(72) Inventors: Radeon Shamilov, Winnipeg (CA); Scott Brewer, Winnipeg (CA)

(73) Assignee: Librestream Technologies Inc

( * ) Notice: Subject to any disclaimer, the term of this patent is extended or adjusted under 35 U.S.C. 154(b) by 0 days.

(21) Appl. No.: 16/561,377

(22) Filed: Sep. 5, 2019

(65) Prior Publication Data

US 2019/0392601 A1 Dec. 26, 2019

Related U.S. Application Data

(62) Division of application No. 15/903,807, filed on Feb. 23, 2018, now Pat. No. 10,489,928.

(51) Int. Cl.

| | |
|---|---|
| ***G06T 7/20*** | (2017.01) |
| ***G06T 11/00*** | (2006.01) |
| ***G06T 7/55*** | (2017.01) |
| ***G06T 7/521*** | (2017.01) |
| ***G06T 5/40*** | (2006.01) |
| ***G06T 7/90*** | (2017.01) |
| ***H04N 5/225*** | (2006.01) |
| *G06T 7/62* | (2017.01) |

(52) U.S. Cl.

CPC .................. *G06T 7/55* (2017.01); *G06T 5/40* (2013.01); *G06T 7/521* (2017.01); *G06T 7/90* (2017.01); *G06T 11/001* (2013.01); *H04N 5/2256* (2013.01); *G06T 7/62* (2017.01); *G06T 2207/10016* (2013.01); *G06T 2207/10024* (2013.01); *G06T 2207/10028* (2013.01); *G06T 2207/20024* (2013.01); *G06T 2207/20224* (2013.01)

(58) Field of Classification Search

CPC combination set(s) only.
See application file for complete search history.

(56) References Cited

U.S. PATENT DOCUMENTS

| | | | | |
|---|---|---|---|---|
| 10,096,122 | B1 * | 10/2018 | Agrawal | G06T 7/194 |
| 2009/0180663 | A1 * | 7/2009 | Stoddart | G06T 7/66 382/100 |
| 2014/0080428 | A1 * | 3/2014 | Rhoads | H04W 4/025 455/88 |
| 2014/0177913 | A1 * | 6/2014 | Holz | H04N 13/254 382/103 |

(Continued)

OTHER PUBLICATIONS

A Novel approach to object trajectories of targets from laser scanned datasets, Galip et al., 2015 18th International Conference on Computer and Information Technology (ICCIT), p. 231-236. (Year: 2015).*

*Primary Examiner* — Jeffery A Williams

(74) *Attorney, Agent, or Firm* — Adrian D. Battison; Ade & Company Inc.; Ryan W. Dupuis

(57) ABSTRACT

An image processing system for inspecting object distance and dimensions is disclosed. A calibrated hand-held camera with an integrated collimated laser is deployed in order to capture input images. The images are then processed in order to determine the object distance and related parameters such as displacements and surface dimensions.

7 Claims, 5 Drawing Sheets

Hand-Held Device
Camera
Sensor
Laser
H
D
Θ
1
2
3
4

(56) References Cited

U.S. PATENT DOCUMENTS

2015/0084884 A1* 3/2015 Cherradi El Fadili ...................... G06F 3/0233 345/173
2015/0253428 A1* 9/2015 Holz ...................... G01S 17/36 356/5.01

* cited by examiner

IMAGE PROCESSING SYSTEM FOR INSPECTING OBJECT DISTANCE AND DIMENSIONS USING A HAND-HELD CAMERA WITH A COLLIMATED LASER

This application is a divisional application from application Ser. No. 15/903,807 filed Feb. 23, 2018.

The present invention related to the application of image processing techniques to inspect object dimensions using a hand-held camera with a collimated laser. More specifically, the application of image processing techniques for the detection of a laser blob in a sequence of images in order to infer object distance and dimensions.

BACKGROUND OF THE INVENTION

As hand-held cameras become ubiquitous, it is desirable to extend their capabilities beyond the basic image acquisition. Camera-based optical triangulation is a cost effective method for optical sensing techniques that can be used to measure distances to objects, and related parameters such as displacements and surface dimensions. Compared to other standalone range finders, camera-based optical triangulation requires minimum hardware addition to existing designs, thus making it an attractive alternative.

The general application of such systems is illustrated in FIG. 1.

-1- The camera optics 1 laterally displace form the laser source 2 by distance H.

-2- The collimated laser source 2 is used to project a laser blob 4 on the object 3 at distance D.

-3- Laser detection method is used to detect the center of the laser blob 4 in terms of exact sensor pixels coordinates.

-4- Preliminary camera calibration is used to determine the angle θ associated with the detected pixel coordinates.

-5- The unknown distance D is determined from $$D = \frac{H}{\tan(\theta)}.$$

For most cases, the preliminary camera calibration and steps 1, 2, and 4 are basically the same. The fundamental difference between individual systems are in stage 3 in relation to the detection of the blob on the pixels as set out hereinafter.

The basic requirement of a camera-based optical triangulation system is the ability to detect the laser blob location in the captured image sequence. The two most common approaches for laser blob detection are based on finding local extrema and background differencing.

In the local extrema method, most blob detection methods in general, and laser blob detection methods in particular, are based on finding local extrema within the image domain. Local extrema detectors usually require image manipulation prior to the extrema search. Moreover, the extrema search for the laser blob detector is often reduced to maximum pixel intensity search in the image domain.

A number of problems arise. Firstly in relation to high intensity background objects, the basic requirement of the disclosed image processing system is the ability to detect the laser projection emitted from the integrated laser source. Additionally, a fundamental characteristic of the laser projection emitted from the integrated laser source is that the resulting laser blob in the image domain can take various forms in terms of size, intensity, and color due to ambient light conditions and the target distance, color, brightness, and texture.

Extrema-based techniques usually cannot distinguish between a laser blob that was originated from the integrated laser source and other bright blobs captured in the processed image.

Further problems can arise in view of non-homogeneous targets. Another fundamental characteristic of the disclosed image processing system is that target objects might have non-homogeneous color, intensity, and texture. Hence, the resulting laser blob in the image domain might also have non-homogeneous form it terms of color, intensity and shape. Extrema-based detectors have a significant difficulty in handling such discontinuities in laser blobs of different sizes.

Yet another requirement of the disclosed image processing system is ability to provide a perceived real-time user feedback. Many of the existing extrema-based image processing approaches for blob detection are computationally intensive and are not suitable for embedded application such as a hand-held camera device.

When appropriate, laser blob detectors can also use a background differencing approach. In this case the background image does not include the laser projection while the foreground image does. The laser blob is detected by computing the difference between every pixel in the background image from the corresponding pixel in the foreground image. High intensity pixels in the resulting difference image are detected as the laser blob.

Problems arise in relation to the background differencing approach firstly in relation to high intensity targets where laser blob detectors that rely on conventional background differencing often fail to properly detect laser projections on high intensity targets. This is due to the non-homogeneous difference image resulting from the background subtraction. In this case different regions of the laser blob have significant intensity differences thus not detected as a laser blob.

Furthermore, variation in ambient light provide another common problem associated with background differencing techniques caused by their high sensitivity to changes in ambient light. Therefore, laser blob detectors based on conventional background differencing are usually used in well controlled environments which is not necessarily the case for hand-held devices.

Yet another problem with the background differencing method, arising from a non-homogeneous background, is that it requires the laser projection to be the only difference between the background image and the foreground image. Since there is a time difference between the acquisitions of the background and the foreground images, factors such as hand shaking, object vibration, and other scenery updates can easily result in false laser detections.

SUMMARY OF THE INVENTION

It is an object of the present invention to provide an improved digital image processing method for measuring object distance and dimensions using a hand-held camera with a collimated laser.

According to a first aspect of the present invention there is provided a method for optically determining the distance to and object using a hand held camera, the method comprising the steps of:

acquiring using camera optics two sequential images of the target object wherein one of the images is a background image and the other of the images is a foreground image;

illuminating the target object in the foreground image with a collimated laser source that is laterally displaced from the camera optics to form a laser blob on the foreground image;

where the target object in the background image is not illuminated with the collimated laser source;

analyzing the background and foreground images in order to extract the laser blob coordinates in the image domain;

and calculating the distance to the object from the blob coordinates;

wherein said analyzing uses a background differencing step which generates a difference image between the background and foreground images;

and wherein in said analyzing both the foreground and background images are filtered using a convolved filter based on a scale independent version of the Bartlett window.

Thus both the foreground and background images are filtered using a convolved filter based on a scale independent version of the Bartlett window in order to reduce interference caused by non-homogenous backgrounds and non-homogenous targets.

Preferably the Bartlett window is implemented by convolving a box filter of size K/2 with itself which in turn is implemented as separate convolution of two 1-dimensional moving average filters resulting in an O (M×N) processing time where M and N represent the image size.

According to a second aspect of the invention there is provided a method for optically determining the distance to and object using a hand held camera, the method comprising the steps of:

acquiring using camera optics two sequential images of the target object wherein one of the images is a background image and the other of the images is a foreground image;

illuminating the target object in the foreground image with a collimated laser source that is laterally displaced from the camera optics to form a laser blob on the foreground image;

where the target object in the background image is not illuminated with the collimated laser source;

analyzing the background and foreground images in order to extract the laser blob coordinates in the image domain;

and calculating the distance to the object from the blob coordinates;

wherein said analyzing uses a background differencing step which generates a difference image between the background and foreground images;

and wherein said analyzing uses a step in which the intensity of one color channel in the foreground image is enhanced relative to other color channels where the enhanced color channel corresponds to a dominant color of the collimated laser source.

According to a third aspect of the invention there is provided a method for optically determining the distance to and object using a hand held camera, the method comprising the steps of:

acquiring using camera optics two sequential images of the target object wherein one of the images is a background image and the other of the images is a foreground image;

illuminating the target object in the foreground image with a collimated laser source that is laterally displaced from the camera optics to form a laser blob on the foreground image;

where the target object in the background image is not illuminated with the collimated laser source;

analyzing the background and foreground images in order to extract the laser blob coordinates in the image domain;

and calculating the distance to the object from the blob coordinates;

wherein said analyzing uses a background differencing step which generates a difference image between the background and foreground images;

wherein the analysing includes a dynamic thresholding step using incremented threshold levels to produce a list of potential laser blobs.

According to a fourth aspect of the invention there is provided a method for optically determining the distance to and object using a hand held camera, the method comprising the steps of:

acquiring using camera optics two sequential images of the target object wherein one of the images is a background image and the other of the images is a foreground image;

illuminating the target object in the foreground image with a collimated laser source that is laterally displaced from the camera optics to form a laser blob on the foreground image;

where the target object in the background image is not illuminated with the collimated laser source;

analyzing the background and foreground images in order to extract the laser blob coordinates in the image domain;

and calculating the distance to the object from the blob coordinates;

wherein said analyzing uses a background differencing step which generates a difference image between the background and foreground images;

wherein the analysing includes producing a list of potential laser blobs;

and wherein a voting function is used to analyze the potential laser blobs based on at least one of their size, aspect ratio, and the original color in the foreground image, where the potential laser blob with the highest vote is selected and its center of mass is used to determine the distance from the camera to the illuminated object.

Preferably, before the background differencing step, the intensity of one color channel in the foreground image is enhanced relative to other color channels where the enhanced color channel corresponds to a dominant color of the collimated laser source in order to reduce interference caused by non-homogenous backgrounds and non-homogenous targets.

Preferably a directional histogram spread is applied to the difference image produced by the background differencing step in order to reduce interference caused by non-homogenous backgrounds and non-homogenous targets.

Preferably, in the histogram spread, individual pixels are enhanced in a manner that results with a top histogram bin having enough pixels to represent the smallest allowable laser blob.

Preferably the difference image produced by the background differencing step is used in a dynamic thresholding step using incremented threshold levels to produce a list of potential laser blobs in order to facilitate blob detection for different size laser blobs, various ambient light condition, and high intensity targets.

Preferably the dynamic thresholding step uses sub-thresholds of at least one of pixel intensity, cluster size, cluster diameter, and cluster aspect ratio which are progressively adjusted to fit laser blobs that fall between the following two laser blob types:

Type A are laser blobs that correspond to one or more of the following:

Close target object.

Dark ambient light condition.

High intensity target object.

Type B are laser blobs that correspond to one or more of the following:

Far target object.

Bright ambient light condition.

Low intensity object.

Preferably a voting function is used to analyze the potential laser blobs based on at least one of their size, aspect ratio, and the original color in the foreground image, where the potential laser blob with the highest vote is selected and its center of mass is used to determine the distance from the camera to the illuminated object.

Preferably the voting function used is:

$$V=aS-bA+cCG$$

Where:

a is the weight coefficient for the size of the laser blob.

S is the size of the laser blob in pixel count.

b is the weight coefficient for the aspect ratio.

A is the aspect ratio of the laser blob.

c is the weight coefficient for the overall color of the laser blob.

CG is the color grade computed for the laser blob.

The method can also include the step of calibrating the hand-held device and determining region of interest (ROI) for laser blob detection.

The method can also include the step of using the distance between the hand-held device and the illuminated object to infer other related parameters such as displacements and surface dimensions in known manner.

In particular, the inventive aspects employ various image processing techniques for laser blob detection using the input images. The proposed blob detection can be divided into two smaller steps comprising of image pre-processing and blob extraction.

The goal of image pre-processing is to accentuate the laser blob features in the image domain thus making it easier to extract the laser blob coordinates. In general, the inventive aspects of the pre-processing step focus on improving the image differencing approach. The input to the pre-processing step are two images captured by the hand-held camera. One of the images is identified as a background image and it does not include the laser projection while the other image is identified as a foreground image that includes the laser projection. That is these images are taken sequentially in no particular order and the only difference is that one is illuminated with the laser which is activated at the required time and the other does not contain the laser beam which is turned off. The laser beam is directed at the main object of the image to be taken.

The output of this background differencing step is a single difference image that has been pre-processed to facilitate more accurate blob detection.

The pre-processing steps include image filtering, image enhancement, image-differencing, and histogram spread.

The input images are first filtered with a Bartlett window in order to eliminate the differences between the background and foreground images that are due to relative motion between the hand-held device and the non-homogeneous background. Additionally, the filter using the Bartlett window homogenizes the laser blob core in the foreground image while preserving the round characteristics of the laser blob thus reducing the effect of non-homogeneous targets. Yet another important advantage of this filter is it the ability to optimize its implementation to be scale independent, thus requiring much less computational resource.

After the filter using the Bartlett window is applied to both input images, errors due to motion are further addressed by enhancing the intensity of one of the color channels in the foreground image. The two resulting images are then differentiated and their histogram is computed.

The final step of the pre-processing is a directional histogram spread that allows for a more accurate laser blob detection.

Next, the resultant difference image and the original foreground image are fed into the blob detection step. The blob detection process employs a dynamic thresholding technique where the process iterates through the difference image with incremented threshold levels until at least one potential laser blob is detected or the maximum threshold level has been reached.

The dynamic thresholding step produces a set of potential laser blobs that are fed into a blob voting stage. The vote function consists of the blob size, aspect ratio and the original color in the foreground image. The blob with the highest vote is selected as the laser blob produced by the integrated laser source and its center of mass is used to determine the distance from the camera to the illuminated object.

DETAILED DESCRIPTION OF THE INVENTION

The following detailed description is divided into three sections. The first section will address the overall image processing flow of the invention. Next, the pre-processing step of the invention will be described in details. The last section will elaborate on the blob extraction process of the invention.

Figure 2:
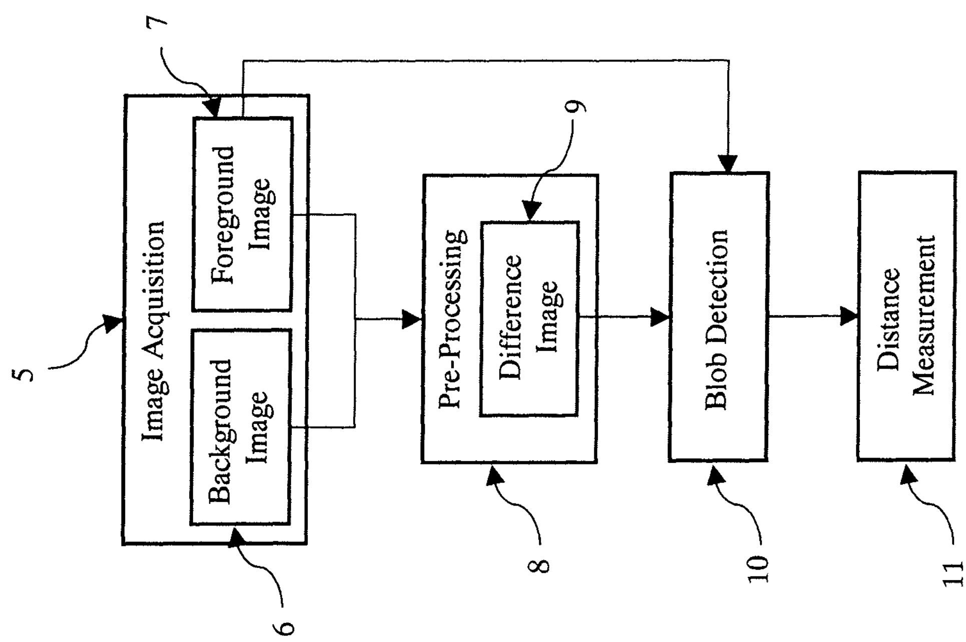
FIG. 2 is a flow chart for the overall image processing method for laser blob detection.

FIG. 2 shows the overall image flow for the image processing method for laser blob detection.

Figure 1:
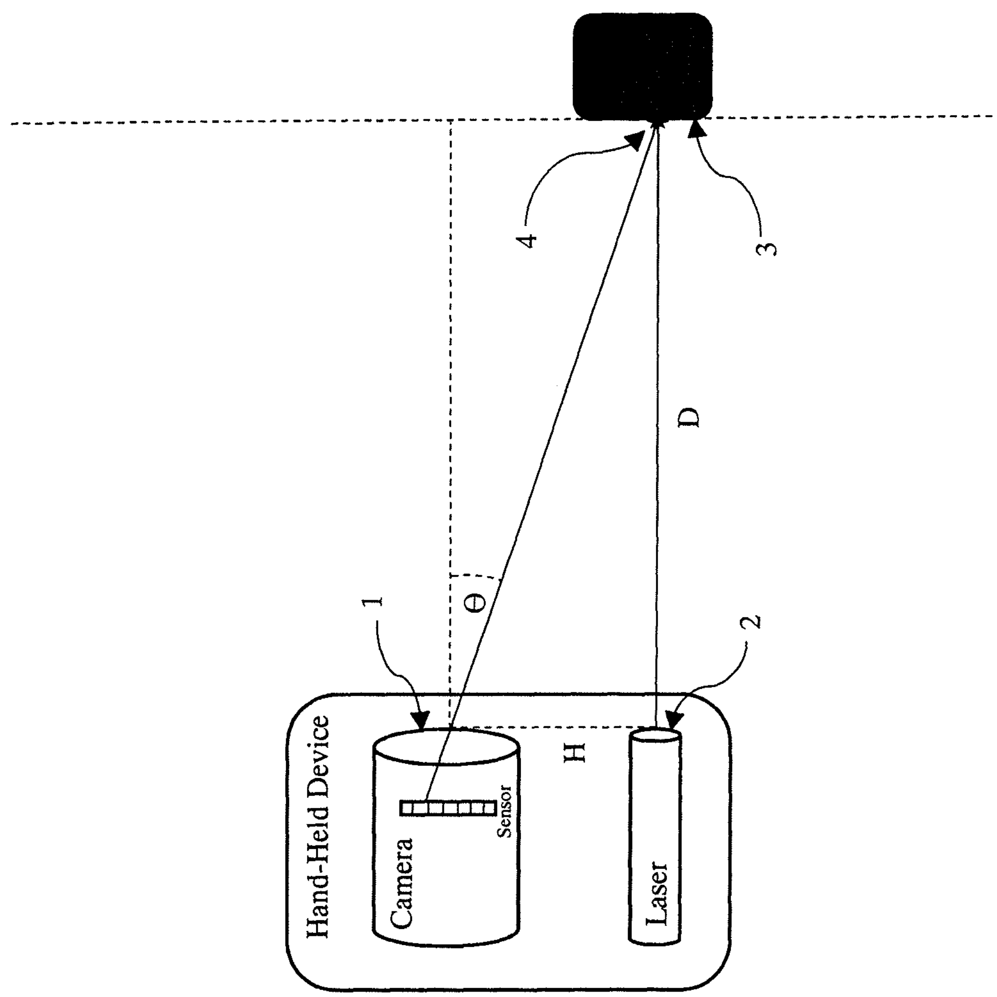
FIG. 1 shows the principles of camera-based optical triangulation.

A previously calibrated hand-held camera device captures at step 5 two sequential images of the target object 3 from FIG. 1. The time between the first and the second image acquisitions is usually under a second and the images are referred to as a background image 6 and a foreground image 7. The target object in the foreground image 7 is illuminated with a collimated laser source that is laterally displaced from the camera optics as shown in FIG. 1. The target object in the background image 6 is not illuminated by the laser source.

Figure 3:
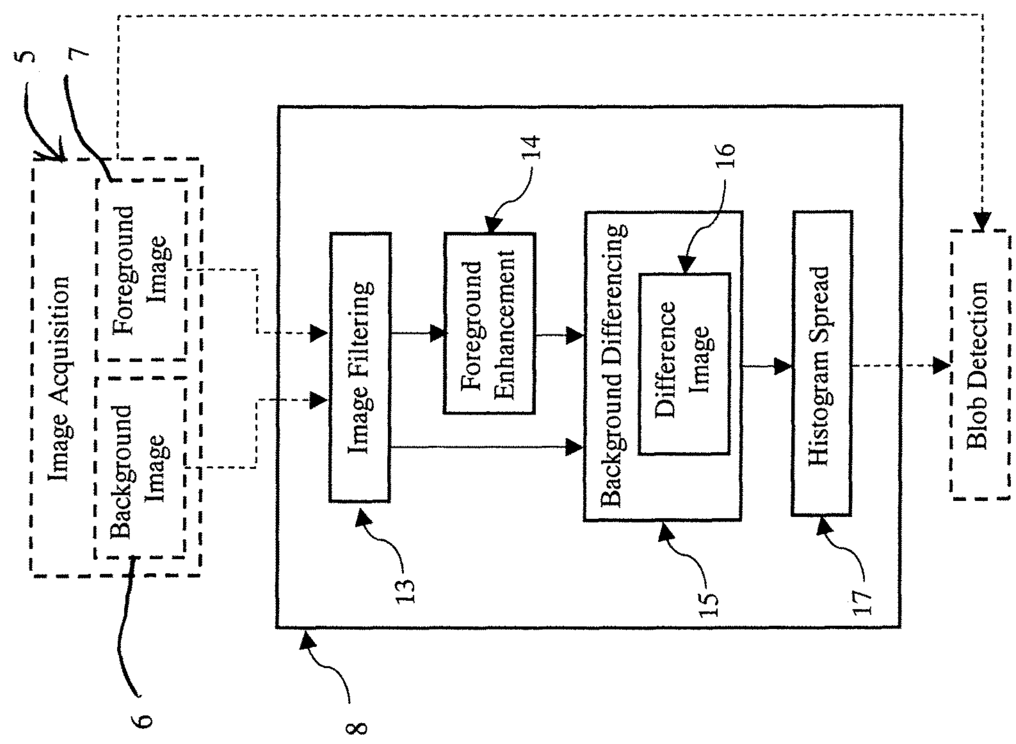
FIG. 3 is a flow chart for the pre-processing step of FIG. 2.

Both images are then fed into the pre-processing step 8 which employs several image processing techniques as shown in FIG. 3 in order to facilitate correct laser blob detection in various environments.

Next, a single pre-processed difference image 9 of the two original images is fed into the blob detection step along with the original foreground image 7. The blob detection step 10 uses dynamic thresholding and a voting mechanism in order to extract the laser blob coordinates in the image domain. Finally, the extracted coordinates of the laser projection are used in the distance measurement step 11 described above in relation to FIG. 1 in order to measure the distance to the captured object and other related parameters. Once the distance measurement step 11 is complete the process can start over at the image acquisition stage 5.

The image pre-processing step accentuates the laser blob features in the image domain and attenuates other background interferences in order to facilitate a more accurate laser blob detection. As shown in FIG. 3. the pre-processing step 8 includes four stages: image filtering 13, foreground enhancement 14, background differencing 15, and histogram spread 17.

The initial pre-processing stage 13 is to filter both input images in order to reduce undesired effects when the laser blob detection is performed in a non-homogeneous background or on a non-homogeneous target.

Acquiring input images in a non-homogeneous background will usually result in high frequency images. Likewise, scenery updates that accrued between the acquisition of the first and second input images will often result in high frequency differences between the two images. Such high frequency differences will interfere with, and in many cases prevent, accurate laser blob detection. The most common cause for high frequency differences between the two input images is relative motion between the hand-held camera and the target object in a non-homogeneous background, more specifically, motion due to shaky hands of the camera operator. In order to attenuate the high frequency differences due to motion, the input images are passed through a Bartlett (triangular) window of size K×K, where K depends on the image resolution and it is set to be about the size of pixel diameter of the smallest laser blob the system is designed to detect.

The Bartlett window is implemented by convolving a box filter of size K/2 with itself which in turn is implemented as separate convolution of two 1-dimensional moving average filters resulting in an O (M×N) processing time where M and N represent the image size. Therefore, the image filtering process does not depend on the scale of the filter thus requiring significantly less computational resources.

The averaging characteristic of the Bartlett window used in the filtering stage 13 also corrects for errors due to non-homogeneous targets. The resulting laser projection on a non-homogeneous targets will also have non-homogeneous characteristics in terms of color, intensity, and texture. More specifically, the laser projection portion that falls onto the high intensity area of the target object will result in low intensity differences while the laser projection that falls onto the low intensity area of the target object will result in high intensity differences. This situation introduces an error when determining the exact center of the laser blob and the averaging characteristics of the Bartlett windows will minimize this error.

The second pre-processing stage 14 is the foreground enhancement which further reduces undesired effects when the laser blob detection is performed in a non-homogeneous background or on a non-homogeneous target.

In the foreground enhancement stage 14, one of the color channels in the foreground image is enhanced. The enhanced color channel in selected based on the dominant color of the laser source, that is, if the dominant laser source is red, then the red channel in the foreground image is enhanced. Enhancing the color channel that correspond to the laser's dominant color will have minimal effect on other high intensity blobs in the foreground image due to pixel saturation, however, it will significantly increase the intensity difference caused by the laser projection. Additionally, due to pixel saturation, the foreground enhancement will homogenize the core of the laser blob which in turn allow for more accurate detection of the center of the laser blob.

In the third stage 15 of the pre-processing step of the invention, the manipulated background and foreground images are used to generate a difference image 16 where each pixel in the difference image represents the intensity difference between the corresponding pixels in the background and foreground images. The pixel intensity in the resulting difference image represents intensity difference between the background and foreground image and therefore the background differencing stage acts to filter out any static high intensity areas around the target object.

During the image differencing stage 15, the histogram of the difference image 16 is also computed as a preparation to the histogram spread performed in the following pre-processing stage.

In the fourth stage 17 of the pre-processing step of the invention, a one direction histogram spread is applied to the difference image 16 in order to allow for more accurate laser blob detection in different ambient light conditions. The histogram spread is performed in a manner that results with the top histogram bin having enough pixels to represent the smallest allowable laser blob. In darker ambient light the laser projection will cause significant intensity differences in the difference image and therefore the histogram spread will have minimal effect. On the other hand, in bright ambient light condition, the laser projection will cause minimal intensity differences in the difference image and the histogram spread will spread these differences and allow better blob detection.

Figure 4:
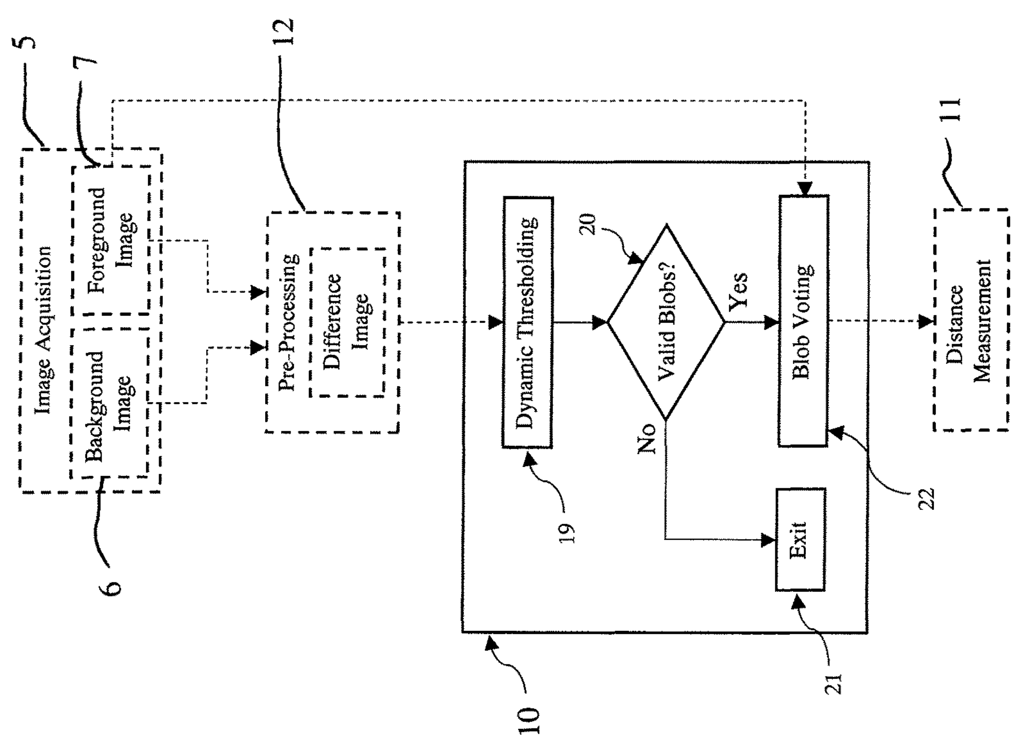
FIG. 4 is a flow chart for the blob detection step of FIG. 2.
Figure 5:
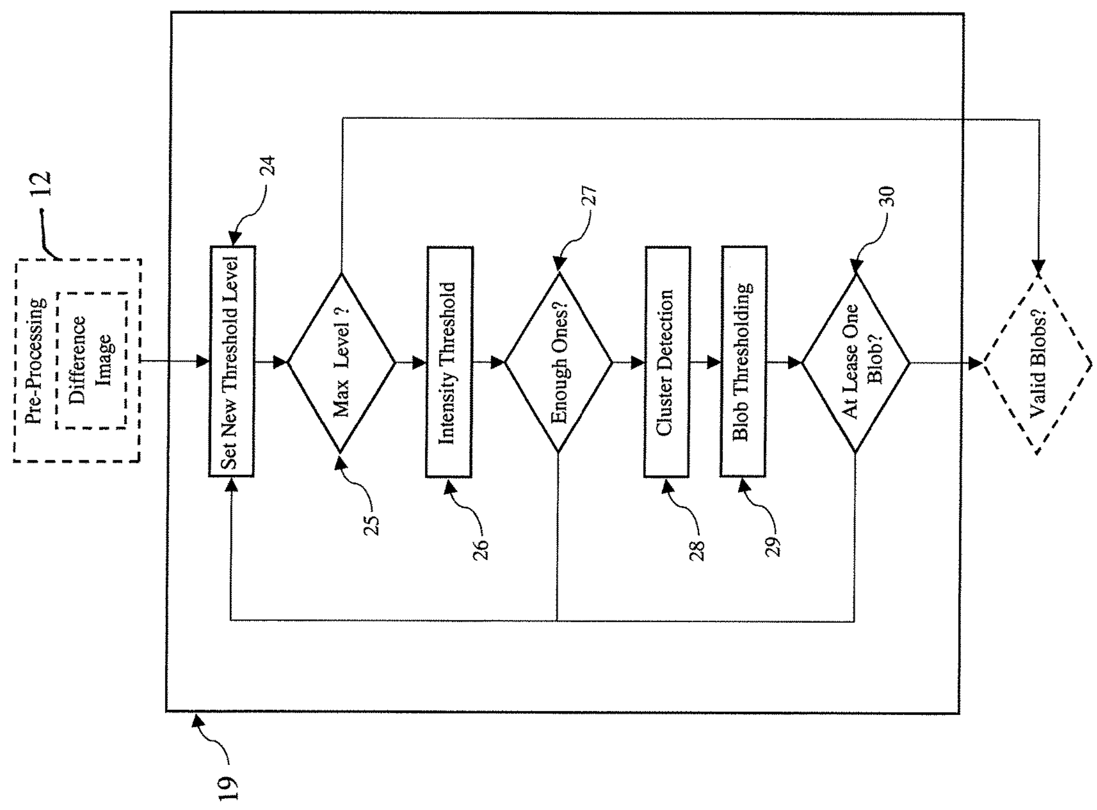
FIG. 5 is a flow chart for the dynamic thresholding stage of the blob detection step of FIG. 4.

The second step of the invention shown in FIGS. 4 and 5 is a laser blob detection method that uses dynamic thresholding and voting mechanism in order to extract the image domain coordinate of the laser blob that originated form the integrated collimated laser source. As shown in FIG. 4, the laser blob detection 10 starts with dynamic thresholding 19 that is used to detect all potential laser blobs in the difference image. In decision 20, if no potential laser blob are detected the process exits 21 and the distance measurement is not performed for the current image sequence. Otherwise, the process continues to the blob voting stage 22 where the best blob is selected and its center of mass is used to determine the distance from the camera to the illuminated object.

In the dynamic thresholding stage, the difference image produced by the image differencing and histogram spread is used in a dynamic thresholding step with incremented threshold levels. The levels are incremented until a satisfactory blob is detected or until the maximum threshold level has been reached. Each threshold level is associated with the following sub-thresholds:

-1- Minimum pixel intensity.

-2- Minimum and maximum blob size.

-3- Minimum and maximum blob diameter.

-4- Minimum and maximum blob aspect ratio.

The sub-thresholds are progressively adjusted to suit laser blobs that fall between the following laser blob types:

-A- Type A laser blobs are laser blob projections that are produced when one or more of the following are true:

-1- Close target object.

-2- Dark ambient light condition.

-3- High intensity target object.

Type A laser blob projections are characterised by:

-1- High pixel intensity in the difference image.

-2- Large laser blob size.

-3- Large laser blob diameter.

-4- High variance from a perfect circle.

-B- Type B laser blobs are laser blob projections that are produced when one or more of the following are true:

-1- Far target object.

-2- Bright ambient light condition.

-3- Low intensity object.

Type B laser blob projections are characterised by:

-1- Low pixel intensity in the difference image.

-2- Small laser blob size.

-3- Small laser blob diameter.

-4- Low variance from a perfect circle.

FIG. 5 shows a detailed flow chart of the dynamic thresholding process 19. The process starts with setting, at step 24, the initial threshold level that is used for the thresholding. The initial threshold level is set to the lowest level that includes sub-thresholds that correspond to laser blobs of type A. Each incremented threshold level includes sub-thresholds that are more suitable for laser blobs of type B.

In decision 25, if the maximum threshold level has been reached and the dynamic thresholding process exits with no potential laser blobs. Otherwise the process continues to apply the sub-threshold that corresponds to the current threshold level. The first sub-threshold that is applied is the intensity threshold 26. The intensity threshold produces a binary image where clusters of "ones" in the resulting binary image represent potential laser blobs. In decision 27, if the count of "ones" in the resulting binary image is less than the smallest allowable laser blob size the thresholding of the difference image is repeated again with an incremented threshold level 24. Once the binary image includes enough "ones" to represent the smallest allowable laser blob the binary image is scanned to detect all clusters of "ones" that represent potential laser blobs 28. A further thresholding of each potential laser blob is then carried out in stage 29 based on its size, diameter, and aspect ratio. In decision 30, if none of the potential blobs passes the blob thresholding stage 29, the thresholding process starts over with an incremented threshold level 24. Otherwise, the process continues to the bob voting stage.

The blob voting stage starts with computing the color grade (CG) for all potential laser blobs. The color grade represents the correlation between the potential laser blob color in the original foreground image and the dominant color of the integrated collimated laser source. For example, if the dominant color of the laser source is red, potential laser blobs that appear red in the original foreground image will receive a higher CG than potential laser blobs that are less red. Once the CGs are assigned, each potential laser blob is given a vote based on:

$$V=aS-bA+cCG$$

Where:

a is the weight coefficient for the size of the laser blob.

S is the size of the laser blob in pixel count.

b is the weight coefficient for the aspect ratio.

A is the aspect ratio of the laser blob.

c is the weight coefficient for the overall color of the laser blob.

CG is the color grade computed for the laser blob.

The blob with the highest vote is selected as the laser blob produced by the integrated laser source and its center of mass is used to determine the distance from the camera to the illuminated object.

The invention claimed is:

1. A method for optically determining the distance to and object using a hand held camera, the method comprising the steps of:

acquiring using camera optics two sequential images of the target object wherein one of the images is a background image and the other of the images is a foreground image;

illuminating the target object in the foreground image with a collimated laser source that is laterally displaced from the camera optics to form a laser blob on the foreground image;

where the target object in the background image is not illuminated with the collimated laser source;

analyzing the background and foreground images in order to extract the laser blob coordinates in the image domain;

and calculating the distance to the object from the blob coordinates;

wherein said analyzing uses a background differencing step which generates a difference image between the background and foreground images;

wherein the analysing includes an iterative thresholding step where the threshold levels are incremented with each iteration until ad least one valid potential laser blob is identified;

wherein said analyzing uses a step in which the intensity of one color channel in the foreground image is enhanced relative to other color channels where the enhanced color channel corresponds to a dominant color of the collimated laser source.

2. The method according to claim 1, wherein a directional histogram spread is applied to the difference image produced by the background differencing step.

3. The method according to claim 1, wherein, in the histogram spread, individual pixels are enhanced in a manner that results with a top histogram bin having enough pixels to represent the smallest allowable laser blob.

4. The method according to claim 1, wherein the difference image produced by the background differencing step is used in an iterative thresholding step using incremented threshold levels to produce a list of potential laser blobs.

5. The method according to claim 4, wherein the iterative thresholding step uses sub-thresholds of at least one of pixel intensity, cluster size, cluster diameter, and cluster aspect ratio which are progressively adjusted to fit laser blobs that fall between the following two laser blob types:

Type A are laser blobs that correspond to one or more of the following:

Close target object;

Dark ambient light condition;

High intensity target object;

Type B are laser blobs that correspond to one or more of the following:

Far target object;

Bright ambient light condition;

Low intensity object.

6. The method according to claim 5 wherein the voting function used is:

$$V=aS-bA+cCG$$

Where:

a is the weight coefficient for the size of the laser blob;

S is the size of the laser blob in pixel count;

b is the weight coefficient for the aspect ratio;

A is the aspect ratio of the laser blob;

c is the weight coefficient for the overall color of the laser blob;

CG is the color grade computed for the laser blob.

7. A method for optically determining the distance to and object using a hand held camera, the method comprising the steps of:

acquiring using camera optics two sequential images of the target object wherein one of the images is a background image and the other of the images is a foreground image;

illuminating the target object in the foreground image with a collimated laser source that is laterally displaced from the camera optics to form a laser blob on the foreground image;

where the target object in the background image is not illuminated with the collimated laser source;

analyzing the background and foreground images in order to extract the laser blob coordinates in the image domain;

and calculating the distance to the object from the blob coordinates;

wherein said analyzing uses a background differencing step which generates a difference image between the background and foreground images;

wherein the analysing includes producing a list of potential laser blobs;

and wherein a voting function is used to analyze the potential laser blobs based on at least one of their size, aspect ratio, and the original color in the foreground image, where the potential laser blob with the highest vote is selected and its center of mass is used to determine the distance from the camera to the illuminated object;

wherein the voting function used is:

$$V=aS-bA+cCG$$

Where:

a is the weight coefficient for the size of the laser blob;

S is the size of the laser blob in pixel count;

b is the weight coefficient for the aspect ratio;

A is the aspect ratio of the laser blob;

c is the weight coefficient for the overall color of the laser blob;

CG is the color grade computed for the laser blob.

* * * * *